United States Patent
Hygren et al.

(10) Patent No.: US 11,546,250 B2
(45) Date of Patent: Jan. 3, 2023

(54) LINK AGGREGATION WITH RECEIVE SIDE BUFFERING

(71) Applicant: Telefonaktiebolaget LM Ericsson (publ), Stockholm (SE)

(72) Inventors: Pierre Hygren, Sjömarken (SE); Per-Arne Thorsén, Öjersjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 135 days.

(21) Appl. No.: 16/960,343

(22) PCT Filed: Jan. 31, 2018

(86) PCT No.: PCT/EP2018/052394
§ 371 (c)(1),
(2) Date: Jul. 7, 2020

(87) PCT Pub. No.: WO2019/149349
PCT Pub. Date: Aug. 8, 2019

(65) Prior Publication Data
US 2020/0374218 A1 Nov. 26, 2020

(51) Int. Cl.
*G01R 31/08* (2020.01)
*H04J 3/06* (2006.01)
(Continued)

(52) U.S. Cl.
CPC ........... *H04L 45/245* (2013.01); *H04L 45/38* (2013.01); *H04L 47/2483* (2013.01); *H04L 47/34* (2013.01)

(58) Field of Classification Search
CPC ....... H04L 47/10; H04L 45/245; H04L 45/38; H04L 47/125; H04L 12/6418;
(Continued)

(56) References Cited

U.S. PATENT DOCUMENTS 7,142,565 B2 * 11/2006 Casaccia .................. H04L 47/10
370/476
7,924,798 B1 * 4/2011 Brown ..................... H04L 69/16
370/476
(Continued)

FOREIGN PATENT DOCUMENTS

| EP | 1701486 A1 * | 9/2006 | ......... G06Q 30/0239 |
| EP | 2774412 A1 | 9/2014 | |
| WO | 2013067433 A1 | 5/2013 | |

OTHER PUBLICATIONS

IEEE Computer Society, "IEEE Standard for Local and Metropolitan Area Networks—Link Aggregation", IEEE Std 802.1AX-2008, Nov. 3, 2008, pp. 1-145, IEEE.
(Continued)

*Primary Examiner* — Edan Orgad
*Assistant Examiner* — Vanneilian Lalchinthang
(74) *Attorney, Agent, or Firm* — Coats & Bennett, PLLC

(57) ABSTRACT

The present disclosure relates to a communication arrangement (110, 130) adapted for link aggregation of a plurality of communication links (120a, 12b, 120c). The communication arrangement (110, 130) is adapted to communicate via the plurality of communication links (120a, 120b, 120c) and comprises a traffic handling unit (112, 132) that is adapted to obtain data segments (414-417, 419-421, 423-425) to be transmitted, and to identify one or more data flows (401, 402, 403, 404) in said data segments. The traffic handling unit is adapted to attach sequence numbers, SEQ, to data segments associated with each identified data flow (401, 402, 403, 404), wherein sequence numbers are independent between data flows and to select a communication link for transmission of a data segment associated with a certain data flow (401, 402, 403, 404). The selecting comprises selecting a previous communication link that has been used for transmission of a previous data segment from said
(Continued)

certain data flow (401, 402, 403, 404) if possible, and selecting any communication link otherwise.

11 Claims, 9 Drawing Sheets

(51) Int. Cl.
 H04L 12/26 (2006.01)
 H04L 45/24 (2022.01)
 H04L 45/00 (2022.01)
 H04L 47/2483 (2022.01)
 H04L 47/34 (2022.01)
(58) Field of Classification Search
 CPC ... H04L 47/24; H04L 47/2483; H04L 69/163; H04L 47/34; H04L 43/00; H04L 45/28; H04L 41/0896; H04W 28/06; H04W 8/04; Y02D 30/50
 USPC .......................................................... 370/389
 See application file for complete search history.

(56) References Cited

U.S. PATENT DOCUMENTS

| | | | | |
|---|---|---|---|---|
| 9,059,932 | B2* | 6/2015 | Schrum | H04L 45/24 |
| 9,565,112 | B2* | 2/2017 | Gale | H04L 12/6418 |
| 2003/0198250 | A1* | 10/2003 | Hakenberg | H04L 69/04 |
| | | | | 370/465 |
| 2009/0116489 | A1* | 5/2009 | Hanks | H04L 47/10 |
| | | | | 370/394 |
| 2010/0182920 | A1 | 7/2010 | Matsuoka | |
| 2014/0233421 | A1* | 8/2014 | Matthews | H04L 49/35 |
| | | | | 370/253 |
| 2016/0182380 | A1* | 6/2016 | Mehra | H04L 47/125 |
| | | | | 709/226 |
| 2017/0048147 | A1* | 2/2017 | Vaidya | H04L 47/125 |
| 2018/0019942 | A1* | 1/2018 | Liang | H04L 47/41 |
| 2018/0098241 | A1* | 4/2018 | Callard | H04W 28/0289 |
| 2020/0007448 | A1 | 1/2020 | Mizrahi et al. | |

OTHER PUBLICATIONS

IEEE Computer Society, "Amendment to Carrier Sense Multiple Access with Collision Detection (CSMA/CD) Access Method and Physical Layer Specifications—Aggregation of Multiple Link Segments", Information Technology—Telecommunications and Information Exchange Between Systems—Local and Metropolitan Area Networks—Specific Requirements, IEEE Std 802.3ad-2000, Mar. 30, 2000, pp. 1-173, IEEE.

Thaler, D. et al., "Multipath Issues in Unicast and Multicast Next-Hop Selection", Network Working Group, RFC 2991, Nov. 1, 2000, pp. 1-9, NWG.

Evensen, K. et al., "A Network-Layer Proxy for Bandwidth Aggregation and Reduction of IP Packet Reordering", 2009 IEEE 34th Conference on Local Computer Networks (LCN 2009), Oct. 20, 2009, pp. 585-592, IEEE.

Prabhavat, S. et al., "Effective Delay-Controlled Load Distribution Over Multipath Networks", IEEE Transactions on Parallel and Distributed Systems, vol. 22 No. 10, Oct. 1, 2011, pp. 1730-1741, IEEE.

* cited by examiner

LINK AGGREGATION WITH RECEIVE SIDE BUFFERING

TECHNICAL FIELD

Link aggregation of a plurality of communication links, performed in a transmitter communication arrangement and a receiver communication arrangement.

BACKGROUND

For communication links, it is known to aggregate two or more links to increase capacity of data transmission. Several ways exist to aggregate links to increase data bandwidth between two points in a network.

One way to do this is Communication link Bonding (RLB) which refers to layer one (L1) schemes, and is agnostic to layer two (L2) and higher protocol layers. Bonding means that different parts of the traffic are conveyed over different links and reassembled when received. If the links have different rates, the delays are different, implying buffering before reassembly when waiting for the subsequent parts of data to arrive over slower links. The link speed may also change arbitrarily between links due to, e.g., different susceptibility to external conditions for different carrier frequencies. Buffering is therefore often centralized and need to be dimensioned for a worst-case scenario. These schemes can be made very effective when it comes to making best use of the available spectrum resources.

There are also L2 and layer three (L3) link aggregation methods. A known such method is the IEEE 802.3ad Link Aggregation (LAG) standard, IEEE Std 802.1AX-2008 and Equal Cost Multipath (ECMP), RFC2991, where link/route allocation is performed based on flow identification assigned via higher protocol layer address fields.

L1 bonding works well from a spectrum efficiency stand point and can also handle varying link bandwidth well, but it suffers partly from complexity problems since forwarding of fragments over several links according to L1 bonding requires strict control over delivery order. Since a strict order of all data segments irrespective of flow identity is preserved, there will of course not be any reordering of data segments. Nevertheless, when many links of different bandwidth are aggregated, and since the status of each link must be known and accounted for, the buffering and reassembly schemes may grow and can become quite complex.

L2/L3 schemes are in comparison less complicated to implement. Basically, a flow is identified by its hash checksum value, often calculated from static address fields. The flow is then assigned to a physical link in an aggregation group. Subsequent data segments with the same hash checksum value are thereafter forwarded to the link originally assigned. This results in that each certain flow only is forwarded by means of one specific corresponding link, which in turn results in that data segment order within flows are preserved. There are several problems associated with this approach, e.g.;

Statistical bias. This could be that the hashing algorithm interferes with address assignment rules in the network thus causing a systematic preference for one link.

Variation width problems when there are few flows. Even without any systematic errors, there is a high possibility of biased outcomes. When assuming 20 flows and "perfect conditions", average possible utilization of the aggregated capacity is as low as 86% with a 25% risk of being as low as 77%.

QoS impact on individual overprovisioned links. I.e. biased link assignment (or temporary congestion on a single link even if distribution otherwise balanced) may lead to unintended data segment drops, i.e. you can drop data segments even when there is capacity available, making the QoS system not really work in a good way.

Consequently, there is a need for improved link aggregation methods.

SUMMARY

It is an object of the present disclosure to provide communication arrangements and methods for improved link aggregation.

This object is obtained by means of a communication arrangement adapted for link aggregation of a plurality of communication links. The communication arrangement is adapted to communicate via the plurality of communication links and comprises a traffic handling unit that is adapted to obtain data segments to be transmitted and to identify one or more data flows in the obtained data segments. The traffic handling unit is further adapted to attach sequence numbers (SEQ) to data segments associated with each identified data flow, where sequence numbers are independent between data flows, and to determine a subset of available communication links out of the plurality of communication links. The subset of available communication links are available for transmission of a data segment within a current time period. The traffic handling unit is further adapted to select a communication link from the subset of available communication links for transmission of a data segment associated with a certain data flow. The selecting comprises selecting a previous communication link that has been used for transmission of a previous data segment from said certain data flow in case said previous communication link is comprised in the subset of available communication links, and selecting any communication link comprised in the subset of available communication links otherwise.

A number of advantages are obtained by means of the present disclosure. Mainly, an enhanced configuration of different devices in a communication link communication system as well as an enhanced interface functionality between these devices is obtained.

According to some aspects, the traffic handling unit is adapted to identify one or more data flows by determining a hash checksum based on a pre-determined section of each data segment, wherein a data flow is identified by a respective hash checksum.

This provides an advantage of uncomplicated identification of the respective data flows.

According to some aspects, the traffic handling unit is adapted to compress sequence numbers prior to attaching sequence numbers.

This provides an advantage of reducing the amount of data transferred via the communication links.

According to some aspects, the traffic handling unit is adapted to differentially compress attached sequence numbers according to an arithmetic difference between a previous and a current sequence number.

This provides an advantage of reducing the amount of data transferred via the communication links.

According to some aspects, the traffic handling unit is adapted to generate an implicit sequence number configured to be unambiguously recreated at a receiving communication arrangement.

This provides an advantage of reducing the amount of data transferred via the communication links.

According to some aspects, the traffic handling unit is adapted to determine a subset of available communication links by maintaining a Link Characterization Table (LCT) comprising status information associated with each communication link in the plurality of communication links. For example, the status information comprises flow control information indicating if a communication link is available for transmission of a data segment.

This provides an advantage of providing a tool for keeping track of communication link status, for example if there are any available communication links.

According to some aspects, the traffic handling unit is adapted to maintain a transmit Flow Identity Table (tFIT) comprising Flow Identities (FI) associated with the identified flows, and corresponding communication link identifiers (LID). The LIDs are arranged to identify said previous communication link used for transmission of the most recently transmitted data segment associated with each FI out of the plurality of communication links.

This provides an advantage of providing a tool for keeping track of the data flows.

This object is also obtained by means of a communication arrangement adapted for link aggregation of a plurality of communication links. The communication arrangement is adapted to communicate via a plurality of communication links and comprises a traffic handling unit that is adapted to receive data segments via the plurality of communication links, and to identify one or more data flows in the received data segments. The traffic handling unit is further adapted to extract sequence numbers attached to received data segments, where the sequence numbers are arranged to be independent between data flows, and to detect data segments received out of sequence, by means of the extracted sequence numbers, where the sequence numbers indicate an in-sequence order of data segments. The traffic handling unit is further adapted to buffer data segments detected as received out of sequence, and to forward data segments according to sequence number order on a port of the communication arrangement.

This provides an advantage of enabling forwarding of data segments over any link in an aggregation group without reordering within individual data flows. Since data segments can be forwarded on any link for any transmission, a steady state pattern will be reached also for a high utilization of the aggregation group. This is also the case with only one data flow. Since order only must be maintained within data flows, necessary buffering is reduced compared to prior art, especially when there are large discrepancies in rate between the links in an aggregation group.

According to some aspects, the traffic handling unit is adapted to identify one or more data flows by determining a hash checksum for a pre-determined section of each data segment, wherein a data flow is identified by a corresponding hash checksum.

This provides an advantage of uncomplicated identification of the respective data flows.

According to some aspects, the traffic handling unit is adapted to decompress extracted sequence numbers.

This provides an advantage of reducing the amount of data transferred via the communication links.

According to some aspects, the traffic handling unit is adapted to decompress differentially encoded sequence numbers.

This provides an advantage of reducing the amount of data transferred via the communication links.

According to some aspects, the traffic handling unit is adapted to decompress implicitly encoded sequence numbers configured to be unambiguously recreated at the communication arrangement.

This provides an advantage of reducing the amount of data transferred via the communication links.

According to some aspects, the traffic handling unit is adapted to detect data segments received out of sequence by maintaining a receive Flow Identity Table (rFIT) comprising Flow Identities (FI) associated with the identified data flows and corresponding communication link identifiers (LID). The LIDs are arranged to identify the communication link, out of the plurality of communication links, used for transmission of the most recently transmitted data segment associated with each FI.

This provides an advantage of providing a tool for keeping track of the data flows.

According to some aspects, the rFIT comprises the attached sequence number, SQN, of the most recently transmitted data segment associated with each FI.

This provides an advantage of providing a tool for keeping track of the most recently transmitted data segment associated with each FI.

According to some aspects, the traffic handling unit is adapted to forward data segments directly when detected as received in sequence.

This provides an advantage of efficient forwarding when possible.

There are also disclosed herein methods associated with the above-mentioned advantages. Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The present disclosure will now be described more in detail with reference to the appended drawings, where.

DETAILED DESCRIPTION

Figure 1:
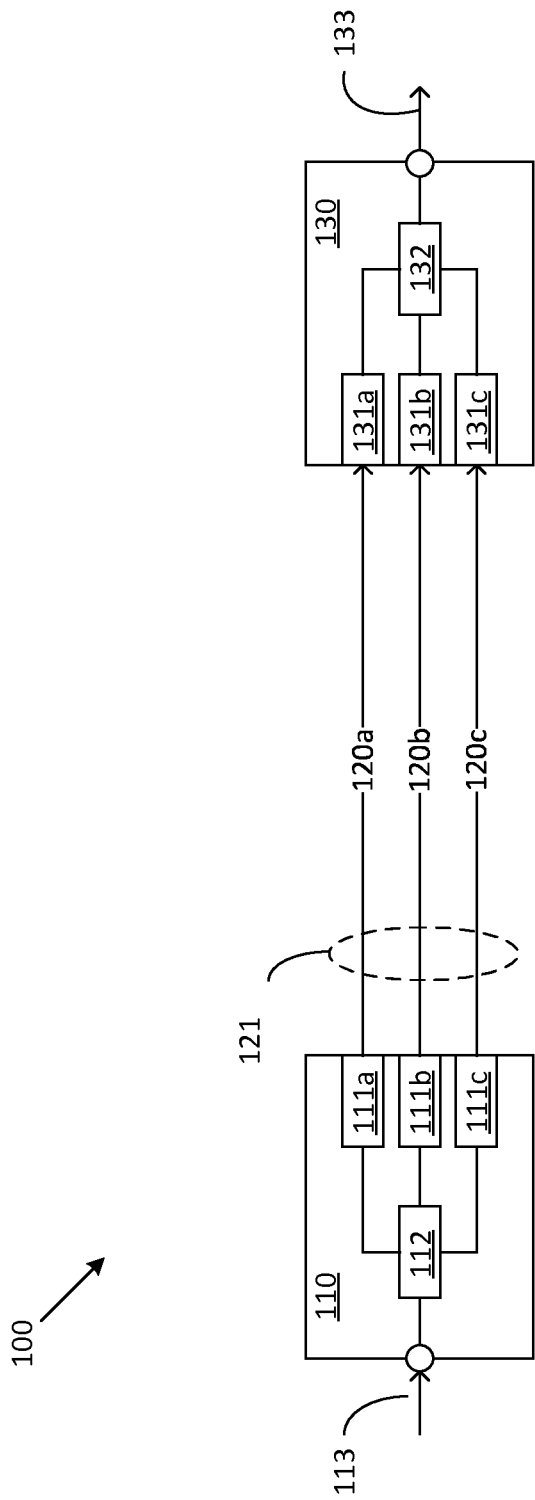
FIG. 1 shows a schematic view of a communication system arranged for link aggregation.

With reference to FIG. 1, a schematic view of a wireless communication arrangement 100 is shown. The wireless communication arrangement 100 comprises a first communication arrangement 110 and a second communication arrangement 130 which are adapted to communicate with each other via a plurality of radio communication links 120a, 120b, 120c. For this purpose, the first communication arrangement 110 comprises a corresponding communication link interface 111a, 111b, 111c for each radio communication link 120a, 120b, 120c, and the second communication arrangement 130 comprises a corresponding communication link interface 131a, 131b, 131c for each radio communication link 120a, 120b, 120c.

Furthermore, the first communication arrangement 110 comprises a first traffic handling unit 112, and the second communication arrangement 130 comprises a second traffic handling unit 132, where each traffic handling unit 112, 132 is adapted to control the communication by routing communication signals that comprise digital data streams.

The radio communication links 120a, 120b, 120c are comprised in an Aggregation Group (AG) 121 and provide an aggregated capacity for forwarding data segments from one bridge or router port. This means that only one Common QoS domain is handled and that sub-optimal dropping cannot occur.

In the following, communication from the first communication arrangement 110 to the second communication arrangement 130 will be described, but according to some aspects, the communication arrangements 110, 130 work reciprocally.

Figure 4:
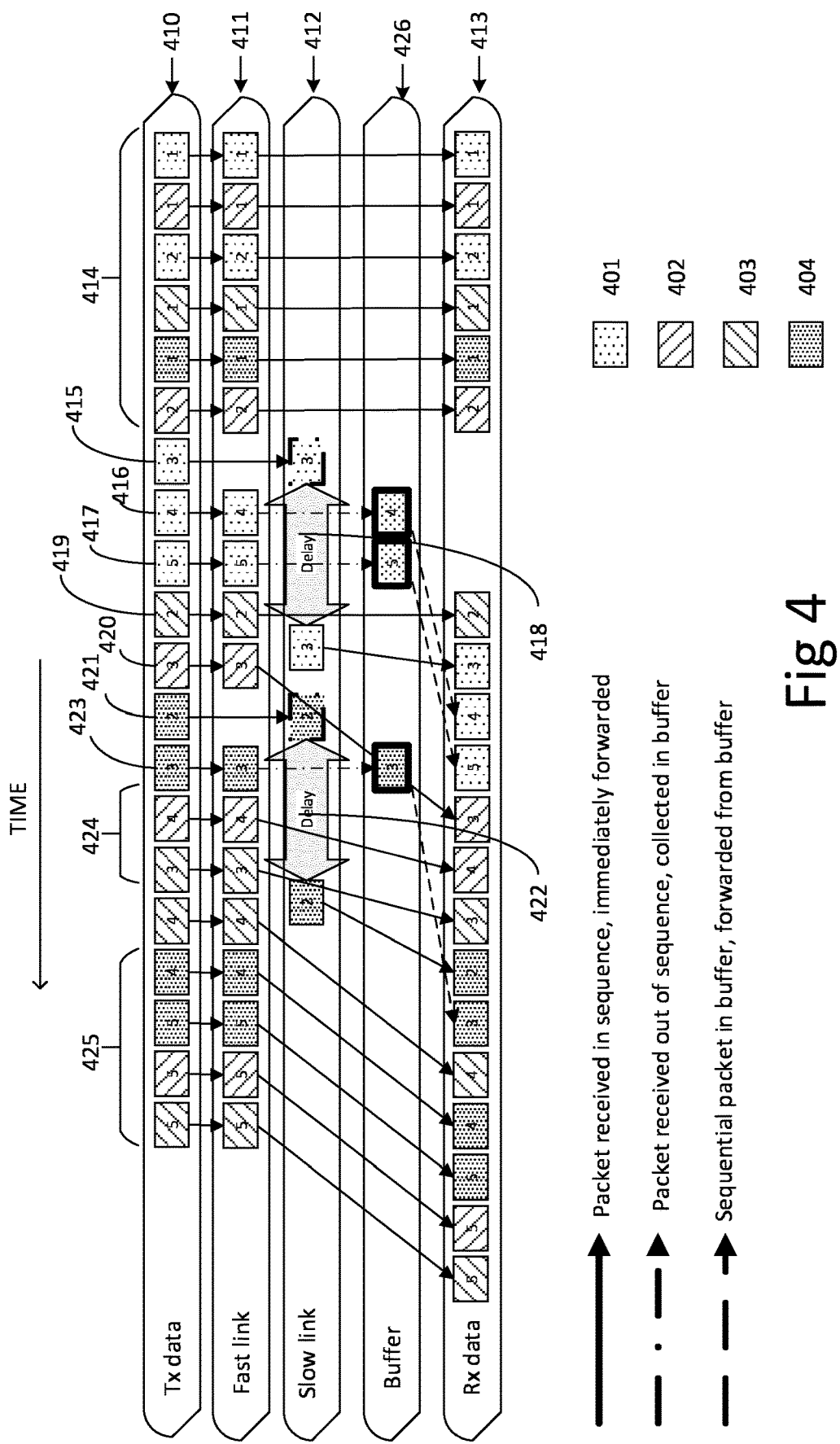
FIG. 4 schematically illustrates transmission and reception of data segments.

With reference also to FIG. 4, the first communication arrangement 110 is adapted to obtain data segments 414-417, 419-421, 423-425 to be transmitted, then the first traffic handling unit 112 is adapted to identify one or more data flows 401, 402, 403, 404 in the obtained data segments 414-417, 419-421, 423-425, to attach sequence numbers (SEQ) to data segments associated with each identified data flow 401, 402, 403, 404, wherein sequence numbers are independent between data flows, and to calculate a hash checksum for each data segment. The result of this calculation is denominated Flow Identity (FI) and used as entry for a Flow Identity Table (FIT) of arbitrary size; this table is maintained as a transmitting side table (tFIT) as well as a receiving side table (rFIT). The table is then used for identifying the different data flows 401, 402, 403, 404 and is constructed from parsing the data flows, no control plane communication over the link is needed to synchronize the tables. The table contains information for each Flow Identity on what link, Link ID (LID) the last data segment was forwarded and the data flow specific sequence number SEQ and also a last sequence number (SQN) for the latest data segment of a certain data flow that has been forwarded over each radio communication link 120a, 120b, 120c in the AG 121.

In this context, a flow or data flow is a coherent and consecutive flow of data segments. A data flow can according to some aspects correspond to a user streaming a film, a user sending an e-mail or a user having a telephone conversation.

According to the present disclosure, the first communication arrangement 110 is then adapted to select a radio communication link from the AG 121 associated with a first data flow, wherein the selecting comprises selecting a previous communication link that has been used for transmission of a previous data segment from said certain data flow 401, 402, 403, 404 in case said previous communication link is comprised in the AG 121, and selecting any communication link comprised in the AG 121 otherwise.

This means that data segments are transmitted whenever there is a free link in the Ag 121. If the link that the previous data segments with the same FI was transmitted over is free, that one shall be preferred.

The flow specific sequence number SEQ is attached to each data segment before transmission to keep track of delivery order. According to some aspects, to minimize the overhead in transmitted data in connection with this, the compression techniques explained below are used.

The sequence number can according to some aspects be specified in three different ways
  Complete: The full sequence number is attached and transmitted over link. This is the method used when no knowledge of previous sequence numbers on the receiving side is assumed or as a regular check of consistency.
  Differential: The arithmetic difference from the previous sequence number is transmitted. This is in particular beneficial when the difference has a shorter representation then the complete sequence number.
  Implicit: The difference in sequence number remain the same between consecutive transmissions. this is in particular beneficial when the sequence number can be unambiguously recreated on the receiving side of the link.

According to some aspects, the first communication arrangement 110 is adapted to first determine subset of available communication links from the AG 121, which subset of available communication links are available for transmission of a data segment within a current time period, and to select a communication link from the subset of available communication links for transmission of a data segment associated with a certain data flow 401, 402, 403, 404. The selecting then comprises selecting a previous communication link that has been used for transmission of a previous data segment from said certain data flow 401, 402, 403, 404 in case said previous communication link is comprised in the subset of available communication links, and selecting any communication link comprised in the subset of available communication links otherwise.

According to some aspects, the determining comprises maintaining a Link Characterization Table, LCT, comprising status information associated with each communication link in the plurality of communication links. For example, the status information comprises flow control information indicating if a communication link is available for transmission of a data segment.

At the second communication arrangement 130, in accordance with the present disclosure, link aggregation of the radio communication links 120a, 120b, 120c is performed. For this purpose, the second communication arrangement 130 is adapted to receive data segments 414-417, 419-421, 423-425 via the radio communication link 120a, 120b, 120c. The second traffic handling unit 132 is then adapted to identify one or more data flows 401, 402, 403, 404 in the received data segments 414-417, 419-421, 423-425, to extract the flow-specific sequence numbers SEQ, to detect data segments 416, 417, 423 received out of sequence by means of the extracted sequence numbers. The second traffic handling unit 132 is further adapted to buffer data segments 416, 417, 423 detected as received out of sequence, and to forward data segments according to sequence number order on an output port 133 of the second communication arrangement 130.

According to some aspects, the second traffic handling unit 132 is adapted to detect data segments received out of sequence by maintaining the receive Flow Identity Table (rFIT) that comprises said Flow Identities (FI) that are associated with the identified data flows, and corresponding communication link identifiers (LIDs). In accordance with the present example, rFIT comprises the attached sequence number, SQN, of the most recently transmitted data segment associated with each FI. According to some aspects, the rFIT is maintained and updated for each new received data segment.

According to some aspects, the second traffic handling unit 132 is adapted to forward data segments directly when detected as received in sequence, and to forward buffered data segments associated with sequence numbers consecutive to sequence numbers of previously forwarded data segments.

This means that when a data segment is received, the FI is calculated and rFIT is checked for over which radio communication link 120a, 120b, 120c the previous data segment with the same FI was transmitted and if the current packet is in sequence or not.

In rFIT, information per FI of the latest sequence number and the latest difference received over each link is maintained and updated for each new received data segment in order to support the compression mechanism.

Out of sequence data segments are buffered. For each FI, data segment received in sequence are immediately collected and forwarded, the buffer is then checked for consecutive data segments to collect.

The second traffic handling unit 132 is according to some aspects adapted to identify said data flows by determining a hash checksum for a pre-determined section of each data segment, where each data flow is identified by a corresponding hash checksum.

The second traffic handling unit 132 is according to some aspects adapted to extract the sequence numbers by decompressing the sequence numbers. For example, the decompressing comprises decompressing differentially encoded sequence numbers or decompressing implicitly encoded sequence numbers configured to be unambiguously recreated by the second traffic handling unit 132 out of the plurality of communication links.

A basic functionality of the present disclosure will now be described more in detail with reference to FIG. 1 and FIG. 4. Here there is a first data flow 401 that is shown with sparse dots, a second data flow 402 that is shown with left to right descending stripes, a third data flow 403 is shown with left to right ascending stripes and a fourth data flow 404 is shown with dense dots. In a Tx data layer 410, the different data flows with data segments have been identified and flow-specific sequence numbers SEQ have been attached to each data segment, denoting the order of the data segments for each data flow. Here, there are two radio communication links available, a first link 411 that is relatively fast and a second link 412 that is relatively slow.

The first six data segments 414 are transferred via the first link 411 and are not buffered but directly forwarded to an Rx data layer 413. The following seventh data segment 415, being comprised in the first data flow 401 and having a SEQ of 3, is transferred via the second link 412. There is a first excess delay 418 before the seventh data segment 415 is forwarded.

A following eighth data segment 416 and ninth data segment 417, both being comprised in the first data flow 401 and having a SEQ of 4 and 5, are transferred via the first link 411. However, due to the first excess delay 418 for the seventh data segment 415, the second traffic handling unit 132 is adapted to buffer the eighth data segment 416 and ninth data segment 417 such that these data segments that all are comprised in the first data flow 401 are forwarded in correct order.

A following tenth data segment 419, comprised in the third data flow 403 and having a SEQ of 2, is transferred via the first link 411. Since the first excess delay 418 has not yet timed out, and the tenth data segment 419 belongs to another data flow than the previous three data segments 415, 416, 417, the tenth data segment 419 is not buffered but directly forwarded to the Rx data layer 413.

A following eleventh data segment 420, comprised in the second data flow 402 and having a SEQ of 3, is transferred via the first link 411. Since the first excess delay 418 has timed out, and the previous three data segments 415, 416, 417 of the first data flow 401 are ready to be forwarded to the Rx data layer 413, the eleventh data segment 420 is forwarded to the Rx data layer 413 thereafter.

A twelfth data segment 421, being comprised in the fourth data flow 404 and having a SEQ of 2, is transferred via the second link 412. There is a second excess delay 422 before the twelfth data segment 421 is forwarded.

A following thirteenth data segment 423, being comprised in the fourth data flow 404 and having a SEQ of 3, is transferred via the first link 411. However, due to the second excess delay 422 for the twelfth data segment 421, the second traffic handling unit 132 is adapted to buffer the thirteenth data segment 423 such that these data segments that are comprised in the fourth data flow 404 are forwarded in correct order.

During the second excess delay 422, two following data segments 424 are transferred via the first link 411 and are not buffered but directly forwarded to the Rx data layer 413.

Then the second excess delay 422 has timed out, and the two data segments 421, 423 of the fourth data flow 404 are forwarded to the Rx data layer 413. The following data segments 425 are transferred via the first link 411 and are not buffered, but directly forwarded to the Rx data layer 413.

According to some aspects, the buffering is performed in a buffering functionality or buffering layer 426 that is comprised in the first communication arrangement 110.

Figure 5:
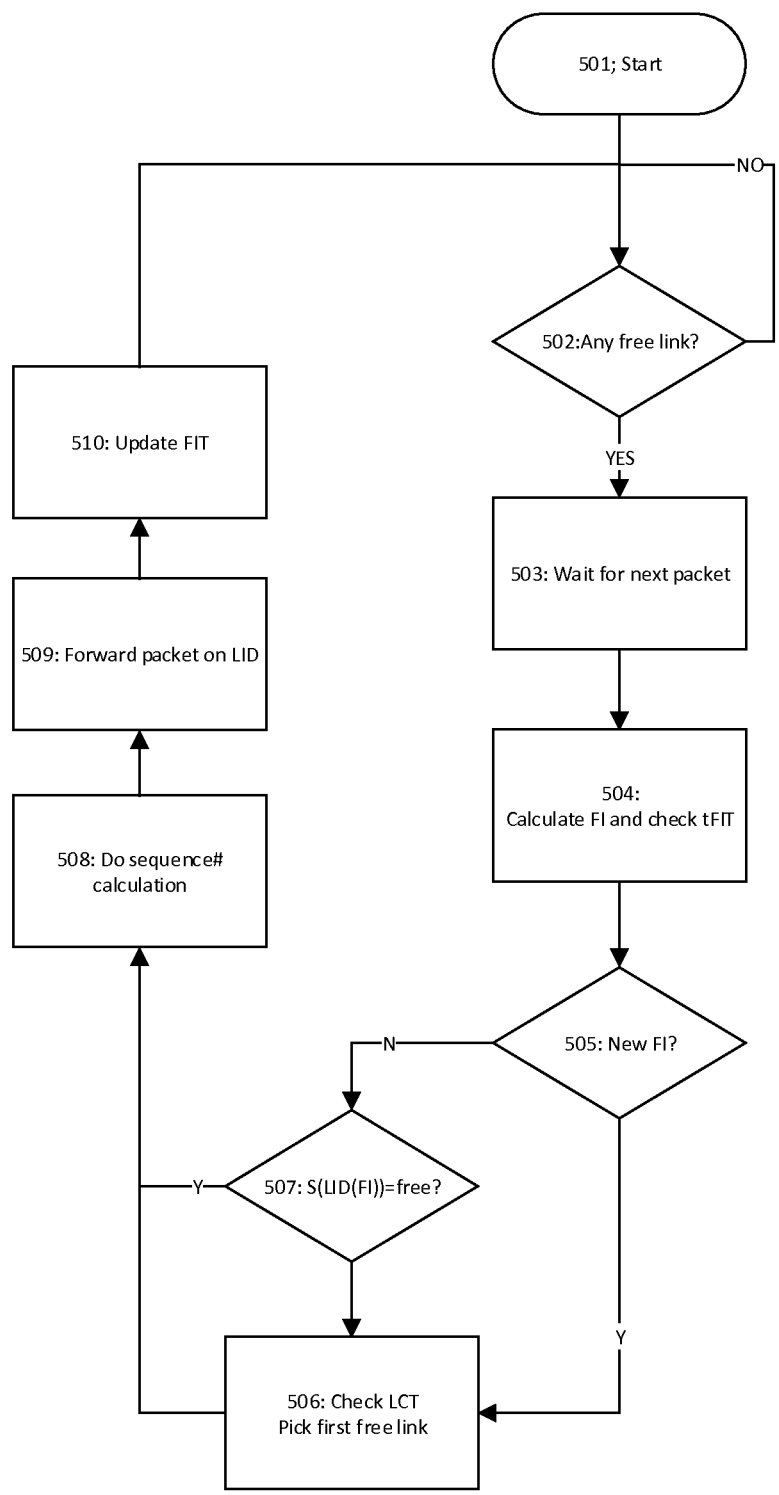
FIG. 5 shows a flowchart illustrating methods according to examples of the present disclosure.

FIG. 5 shows a flow chart of a process according to some aspects at the first communication arrangement 110. After start 501, it is investigated 502 if there are any free links available until there are. Then, a next data segment, or data packet, is awaited 503. For that data segment FI is calculated and tFIT is checked 504. It is investigated 505 if it is a new FI, and if that is the case LCT is checked and a first free link is picked 506. If not, it is investigated if the link via which the last data segment of the flow in question was forwarded is free 507, and if not LCT is checked and a first free link is picked 506.

In any case, in the following, a SEQ calculation is performed 508, the data segment is forwarded on LID 509 and FIT is updated 510.

Figure 6:
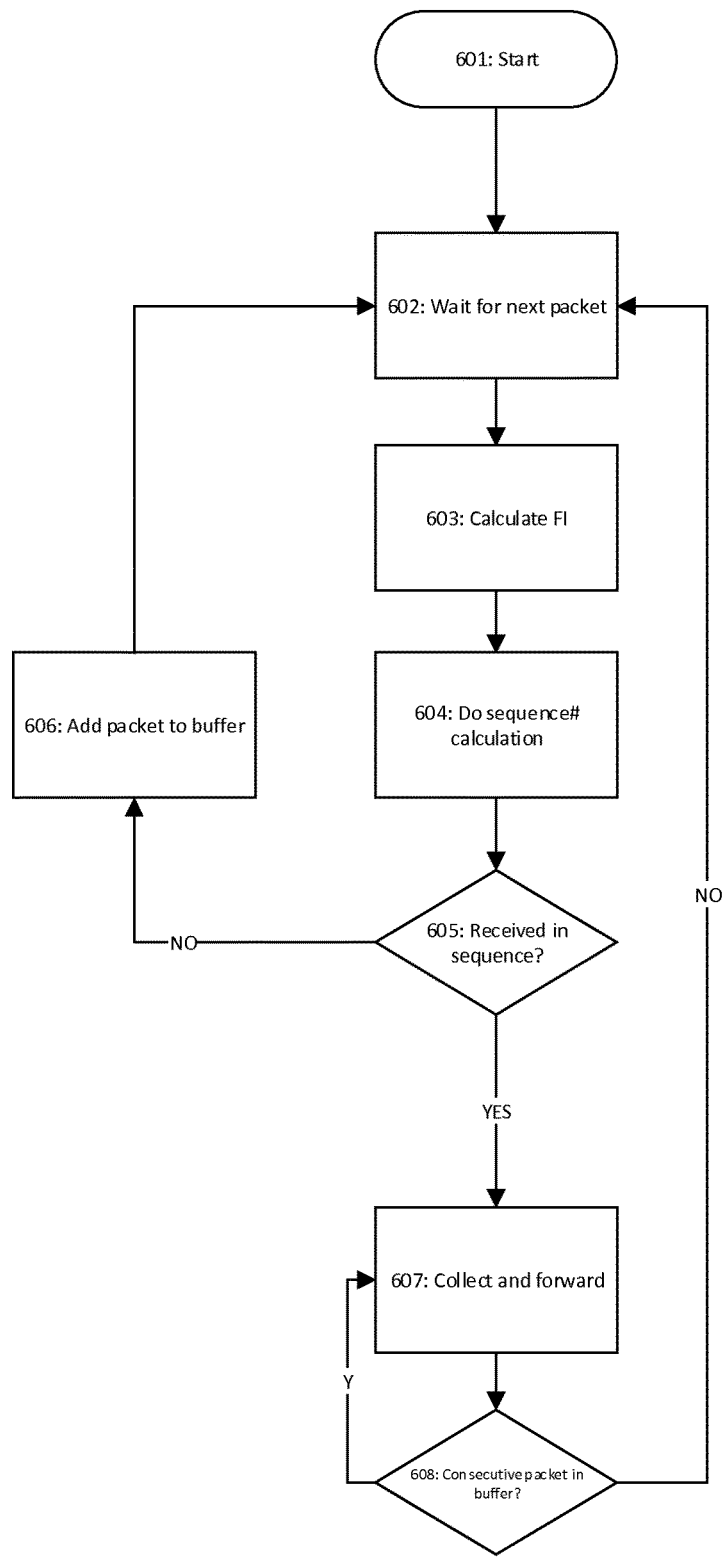
FIG. 6 shows a flowchart illustrating methods according to examples of the present disclosure.

FIG. 6 shows a flow chart of a process according to some aspects at the second communication arrangement 130. After start 601, a next data segment, or data packet, is awaited 602. For that data segment FI is calculated 603 and SEG is calculated 604. It is investigated if the data segment is received in sequence order 605, and if not the data segment is buffered 606 and a new data segment is awaited 602. If the data segment is received in sequence order, it is collected and forwarded 607. It is then investigated if a consecutive data segment is buffered 608, and if that case, it is also collected and forwarded 607. If not, a new data segment is awaited 602.

The buffering at the receiving side which in the above is described for the second communication arrangement 130 provides a dynamic allocation where a previous radio communication link 120a, 120b, 120c is preferred for each data flow. Each data flow will be routed to radio communication links 120a, 120b, 120c having sufficient capacity for the complete flow. If there are two radio communication links with relative capacitates 0.2 and 1.0 and two data flows with the relative rates 0.5 and 0.1, these data flows are transferred via the link with the relative capacity 1.0. If a third data flow with the relative rate 0.5 is added, it will be transferred via the link with the relative capacity 1.0, and the data flow with the relative rate 0.1 will be transferred to the radio communication link with relative capacity 0.2. The data flow with the relative rate 0.1 will thereafter remain at the radio communication link with relative capacity 0.2.

The sequence numbering for each data flow minimizes buffering since different data flows are handled separately and do not need to be forwarded in order. The compression of sequence numbers, i.e. transmitting only the difference from the last transmission or not attaching a sequence number at all when it can be predicted on the receiver side brings down the communication overhead on the radio communication link. It is thus possible to forward data segments over any radio communication link in an aggregation group without reordering within individual flows.

Since data segments can be forwarded on any radio communication link for any transmission, a steady state pattern will be reached also when the utilization of the aggregation group is high. This is also the case with only one data flow. Also, since every data flow prefer to stay on the same radio communication link, data flows will be "attracted" to radio communication links that can sustain the data flow's full capacity need.

Since order only must be maintained within data flows, necessary buffering is less than for Communication link Bonding, especially when there are large discrepancies in rate between the links in an aggregation group. This is accomplished by attaching separate sequence number per data flow.

The present disclosure is not limited to the examples above, but may vary freely within the scope of the appended claims.

For example, one or more of the radio communication links 120a, 120b, 120c need not be wireless radio links, by may be wired communication links. Generally, they are constituted by communication links 120a, 120b, 120c, and the communication link interfaces 111a, 111b, 111c; 131a, 131b, 131c are adapted for the present kind of communication link. For example, for a radio communication link, the communication link interface comprises a microwave radio and link antenna.

Generally, the first traffic handling unit 112 is adapted to obtain data segments 414-417, 419-421, 423-425 to be transmitted, to identify one or more data flows 401, 402, 403, 404 in the obtained data segments 414-417, 419-421, 423-425, and to attach sequence numbers (SEQ) to data segments associated with each identified flow 401, 402, 403, 404, wherein sequence numbers are independent between data flows. The first traffic handling unit 112 is further adapted to determine a subset of available communication links out of the plurality of communication links 120a, 120b, 120c, which subset of available communication links are available for transmission of a data segment within a current time period, and to select a communication link from the subset of available communication links for transmission of a data segment associated with a certain data flow 401, 402, 403, 404. The selecting comprises selecting a previous communication link that has been used for transmission of a previous data segment from said certain data flow 401, 402, 403, 404 in case said previous communication link is comprised in the subset of available communication links, and selecting any communication link comprised in the subset of available communication links otherwise.

Generally, at the second communication arrangement 130, link aggregation of the radio communication links 120a, 120b, 120c is performed. For this purpose, the second communication arrangement 130 is adapted to receive data segments 414-417, 419-421, 423-425 via the plurality of communication links 120a, 120b, 120c. The second traffic handling unit 132 is then adapted to identify one or more data flows 401, 402, 403, 404 in the received data segments 414-417, 419-421, 423-425, to extract the flow-specific sequence numbers to detect data segments 416, 417, 423 received out of sequence by means of the extracted sequence numbers. The second traffic handling unit 132 is further adapted to buffer data segments 416, 417, 423 detected as received out of sequence, and to forward data segments according to sequence number order on an output port 133.

Figure 2:
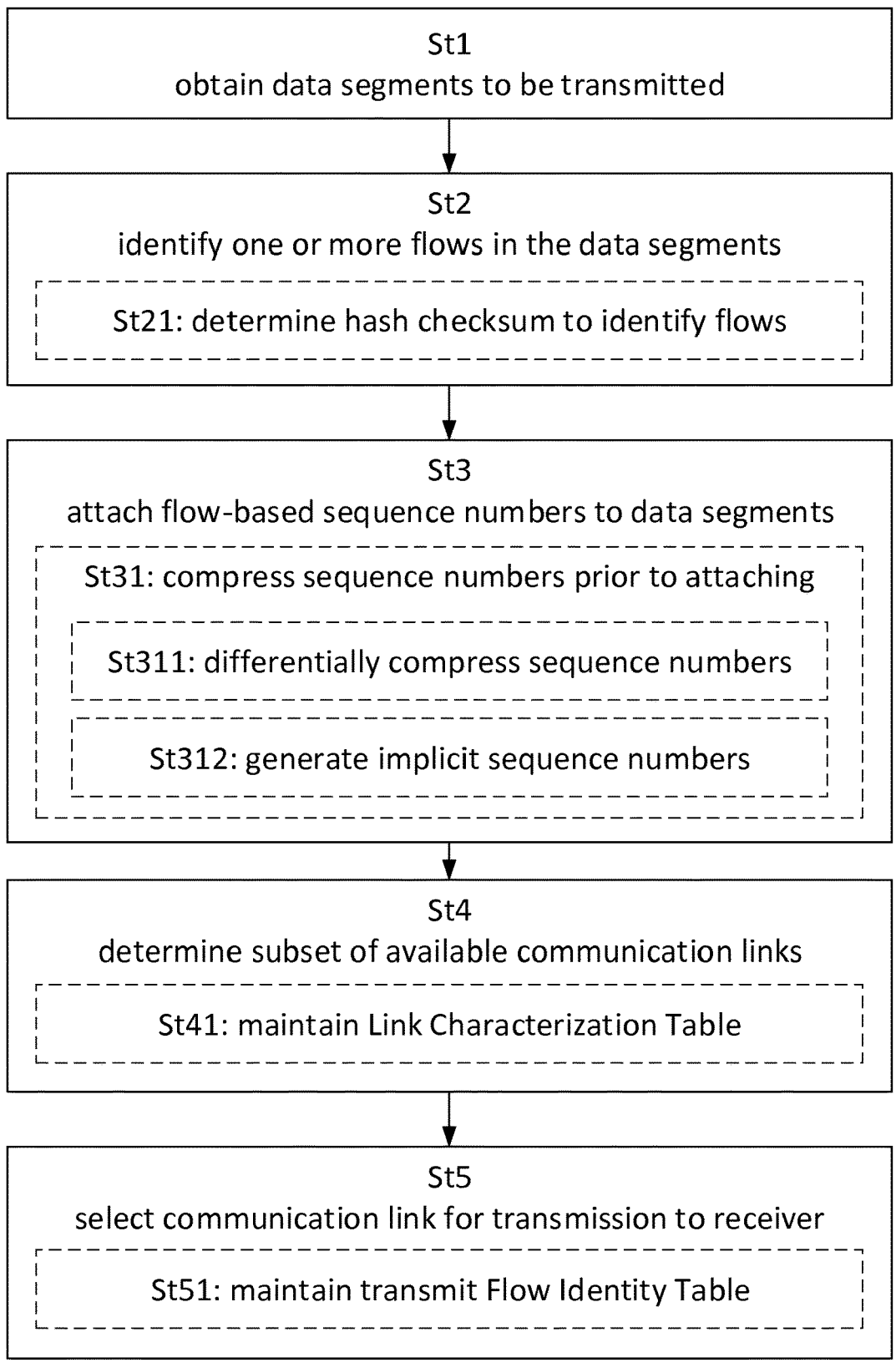
FIG. 2 shows a flowchart illustrating methods according to examples of the present disclosure.

With reference to FIG. 2, the present disclosure relates to a method for link aggregation of a plurality of communication links 120a, 120b, 120c, performed in a communication arrangement 110, 130, comprising;

obtaining St1 data segments 414-417, 419-421, 423-425 to be transmitted, identifying St2 one or more data flows 401, 402, 403, 404 in the obtained data segments 414-417, 419-421, 423-425, attaching St3 sequence numbers, SEQ, to data segments 414-417, 419-421, 423-425 associated with each identified data flow 401, 402, 403, 404, wherein sequence numbers are independent between data flows, determining St4 a subset of available communication links out of the plurality of communication links 120a, 120b, 120c, which subset of available communication links are available for transmission of a data segment within a current time period, and selecting St5 a communication link from the subset of available communication links for transmission of a data segment associated with a certain data flow 401, 402, 403, 404, wherein the selecting comprises selecting a previous communication link that has been used for transmission of a previous data segment from said certain data flow 401, 402, 403, 404 in case said previous communication link is comprised in the subset of available communication links, and selecting any communication link comprised in the subset of available communication links otherwise.

According to some aspects, the identifying St2 comprises determining St21 a hash checksum based on a pre-determined section of each data segment, wherein a data flow is identified by a respective hash checksum.

According to some aspects, the attaching St3 comprises compressing St31 sequence numbers prior to attaching.

According to some aspects, the compressing St31 comprises differentially compressing St311 attached sequence numbers according to an arithmetic difference between a previous and a current sequence number.

According to some aspects, the compressing St31 comprises generating St312 an implicit sequence number configured to be unambiguously recreated on the receiving side of a communication link out of the plurality of communication links 120a, 120b, 120c.

According to some aspects, the determining St4 comprises maintaining St41 a Link Characterization Table, LCT, comprising status information associated with each communication link in the plurality of communication links 120a, 120b, 120c.

According to some aspects, the status information comprises flow control information indicating if a communication link is available for transmission of a data segment.

According to some aspects, the selecting St5 comprises maintaining St51 a transmit Flow Identity Table, tFIT, comprising Flow Identities, FI, associated with the identified data flows 401, 402, 403, 404, and corresponding communication link identifiers, LID, wherein the LIDs are used for identifying said previous communication link used for transmission of the most recently transmitted data segment associated with each FI out of the plurality of communication links 120a, 120b, 120c.

According to some aspects, the tFIT comprises the attached sequence number, SQN, of the most recently transmitted data segment associated with each FI.

According to some aspects, the plurality of communication links 120a, 12b, 120c comprises one or more radio communication links 120a, 120b, 120c, and wherein the communication arrangement 110, 130 comprises a traffic handling unit 112, 132 and a communication link interface 111a, 111b, 111c; 131a, 131b, 131c for each communication link 120a, 120b, 120c.

Figure 3:
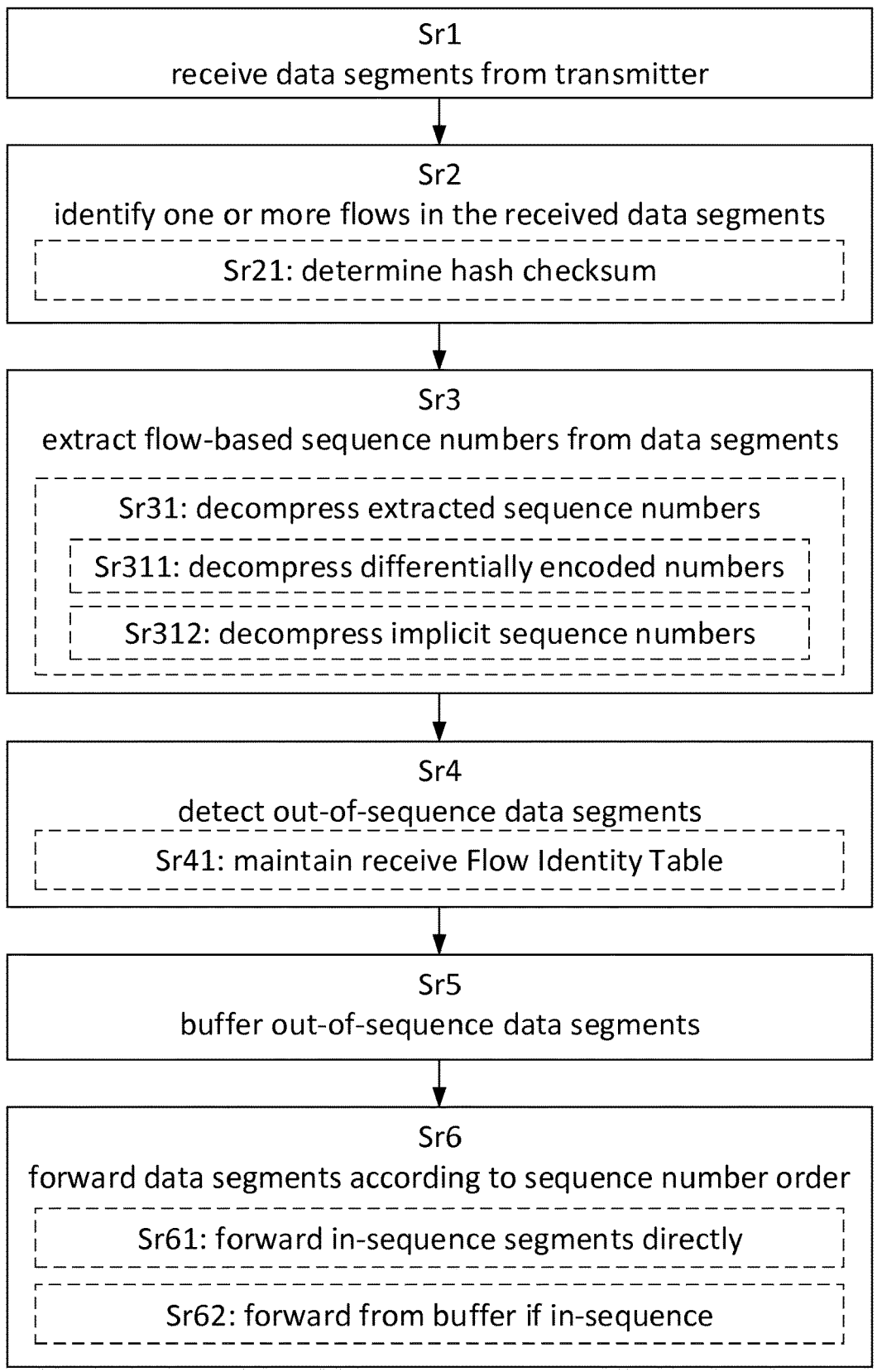
FIG. 3 shows a flowchart illustrating methods according to examples of the present disclosure.

With reference to FIG. 3, the present disclosure also relates to a method for link aggregation of a plurality of communication links 120a, 120b, 120c, performed in a communication arrangement 130, 110, comprising;

receiving Sr1 data segments 414-417, 419-421, 423-425 via the plurality of communication links 120a, 120b, 120c, identifying Sr2 one or more data flows 401, 402, 403, 404 in the received data segments, extracting Sr3 sequence numbers attached to received data segments 414-417, 419-421, 423-425, wherein the sequence numbers are arranged to be independent between data flows, detecting Sr4 data segments received out of sequence 416, 417, 423, by means of the extracted sequence numbers, wherein the sequence numbers indicate an in-sequence order of data segments, buffering Sr5 data segments 416, 417, 423 detected as received out of sequence, and forwarding Sr6 data segments according to sequence number order on a port 133, 113 of the communication arrangement 130, 110.

According to some aspects, the identifying Sr2 comprises determining Sr21 a hash checksum for a pre-determined section of each data segment, wherein a data flow is identified by a corresponding hash checksum.

According to some aspects, the extracting Sr3 comprises decompressing Sr31 extracted sequence numbers.

According to some aspects, the decompressing Sr31 comprises decompressing Sr311 differentially encoded sequence numbers.

According to some aspects, the decompressing Sr31 comprises decompressing Sr312 implicitly encoded sequence numbers configured to be unambiguously recreated on the receiving side of a communication link 130, 110 out of the plurality of communication links 120a, 120b, 120c.

According to some aspects, the detecting Sr4 comprises maintaining Sr41 a receive Flow Identity Table, rFIT, comprising Flow Identities, FI, associated with the identified data flows 401, 402, 403, 404, and corresponding communication link identifiers, LID, wherein the LIDs are arranged to identify the communication link, out of the plurality of communication links 120a, 120b, 120c, used for transmission of the most recently transmitted data segment associated with each FI.

According to some aspects, the rFIT comprises the attached sequence number, SQN, of the most recently transmitted data segment associated with each FI.

According to some aspects, the rFIT comprises information per FI of the latest sequence number, wherein the rFIT is maintained and updated for each new received data segment.

According to some aspects, the forwarding Sr6 comprises forwarding Sr61 data segments directly when detected as received in sequence.

According to some aspects, the forwarding Sr6 comprises forwarding Sr62 data segments from buffer associated with sequence numbers consecutive to sequence numbers of previously forwarded data segments.

According to some aspects, the plurality of communication links 120a, 12b, 120c comprise one or more radio communication links 120a, 120b, 120c, and wherein the communication arrangement 110, 130 comprises a traffic handling unit 112, 132 and a communication link interface 111a, 111b, 111c; 131a, 131b, 131c for each communication link 120a, 120b, 120c.

Generally, the present disclosure also relates to a communication arrangement 110, 130 adapted for link aggregation of a plurality of communication links 120a, 12b, 120c, which communication arrangement 110, 130 is adapted to communicate via the plurality of communication links 120a, 120b, 120c and comprises a traffic handling unit 112, 132 which traffic handling unit 112, 132 is adapted to:

obtain data segments 414-417, 419-421, 423-425 to be transmitted, identify one or more data flows 401, 402, 403, 404 in the obtained data segments 414-417, 419-421, 423-425, attach sequence numbers, SEQ, to data segments associated with each identified data flow 401, 402, 403, 404, wherein sequence numbers are independent between data flows, determine a subset of available communication links out of the plurality of communication links 120a, 120b, 120c, which subset of available communication links are available for transmission of a data segment within a current time period, and to select a communication link from the subset of available communication links for transmission of a data segment associated with a certain data flow 401, 402, 403, 404, wherein the selecting comprises selecting a previous communication link that has been used for transmission of a previous data segment from said certain data flow 401, 402, 403, 404 in case said previous communication link is comprised in the subset of available communication links, and selecting any communication link comprised in the subset of available communication links otherwise.

According to some aspects, the traffic handling unit 112, 132 is adapted to identify one or more data flows by determining a hash checksum based on a pre-determined section of each data segment, wherein a data flow is identified by a respective hash checksum.

According to some aspects, the traffic handling unit 112, 132 is adapted to compress sequence numbers prior to attaching sequence numbers.

According to some aspects, the traffic handling unit 112, 132 is adapted to differentially compress attached sequence numbers according to an arithmetic difference between a previous and a current sequence number.

According to some aspects, the traffic handling unit 112, 132 is adapted to generate an implicit sequence number configured to be unambiguously recreated at a receiving communication arrangement 130, 110.

According to some aspects, the traffic handling unit 112, 132 is adapted to determine a subset of available communication links by maintaining a Link Characterization Table, LCT, comprising status information associated with each communication link in the plurality of communication links 120a, 120b, 120c.

According to some aspects, the status information comprises flow control information indicating if a communication link is available for transmission of a data segment. According to some aspects, the traffic handling unit 112, 132 is adapted to maintain a transmit Flow Identity Table, tFIT, comprising Flow Identities, FI, associated with the identified flows, and corresponding communication link identifiers, LID, wherein the LIDs are arranged to identify said previous communication link used for transmission of the most recently transmitted data segment associated with each FI out of the plurality of communication links 120a, 120b, 120c.

According to some aspects, the tFIT comprises the attached sequence number, SQN, of the most recently transmitted data segment associated with each FI.

The present disclosure also relates to a communication arrangement 130, 110 adapted for link aggregation of a plurality of communication links, which communication arrangement 130, 110 is adapted to communicate via a plurality of communication links 120a, 120b, 120c and comprises a traffic handling unit 132, 122 which traffic handling unit 132, 122 is adapted to:

receive data segments 414-417, 419-421, 423-425 via the plurality of communication links 120a, 120b, 120c, identify one or more data flows 401, 402, 403, 404 in the received data segments 414-417, 419-421, 423-425, extract sequence numbers attached to received data segments 414-417, 419-421, 423-425, wherein the sequence numbers are arranged to be independent between data flows, detect data segments 416, 417, 423 received out of sequence, by means of the extracted sequence numbers, wherein the sequence numbers indicate an in-sequence order of data segments, buffer data segments 416, 417, 423 detected as received out of sequence, and to forward data segments according to sequence number order on a port 133, 113 of the communication arrangement 130, 110.

According to some aspects, the traffic handling unit 132, 122 is adapted to identify one or more data flows by determining a hash checksum for a pre-determined section of each data segment, wherein a data flow is identified by a corresponding hash checksum.

According to some aspects, the traffic handling unit 132, 122 is adapted to decompress extracted sequence numbers.

According to some aspects, the traffic handling unit 132, 122 is adapted to decompress differentially encoded sequence numbers.

According to some aspects, the traffic handling unit 132, 122 is adapted to decompress implicitly encoded sequence numbers configured to be unambiguously recreated at the communication arrangement 130, 110.

According to some aspects, the traffic handling unit 132, 122 is adapted to detect data segments received out of sequence by maintaining a receive Flow Identity Table, rFIT, comprising Flow Identities, FI, associated with the identified data flows 401, 402, 403, 404, and corresponding communication link identifiers, LID, wherein the LIDs are arranged to identify the communication link, out of the plurality of communication links 120a, 120b, 120c, used for transmission of the most recently transmitted data segment associated with each FI.

According to some aspects, the rFIT comprises the attached sequence number, SQN, of the most recently transmitted data segment associated with each FI.

According to some aspects, the rFIT comprises information per FI of the latest sequence number, wherein the rFIT is maintained and updated for each new received data segment.

According to some aspects, the traffic handling unit 132, 122 is adapted to forward data segments directly when detected as received in sequence.

According to some aspects, the traffic handling unit 132, 122 is adapted to forward buffered data segments which are associated with sequence numbers consecutive to sequence numbers of previously forwarded data segments.

Figure 7:
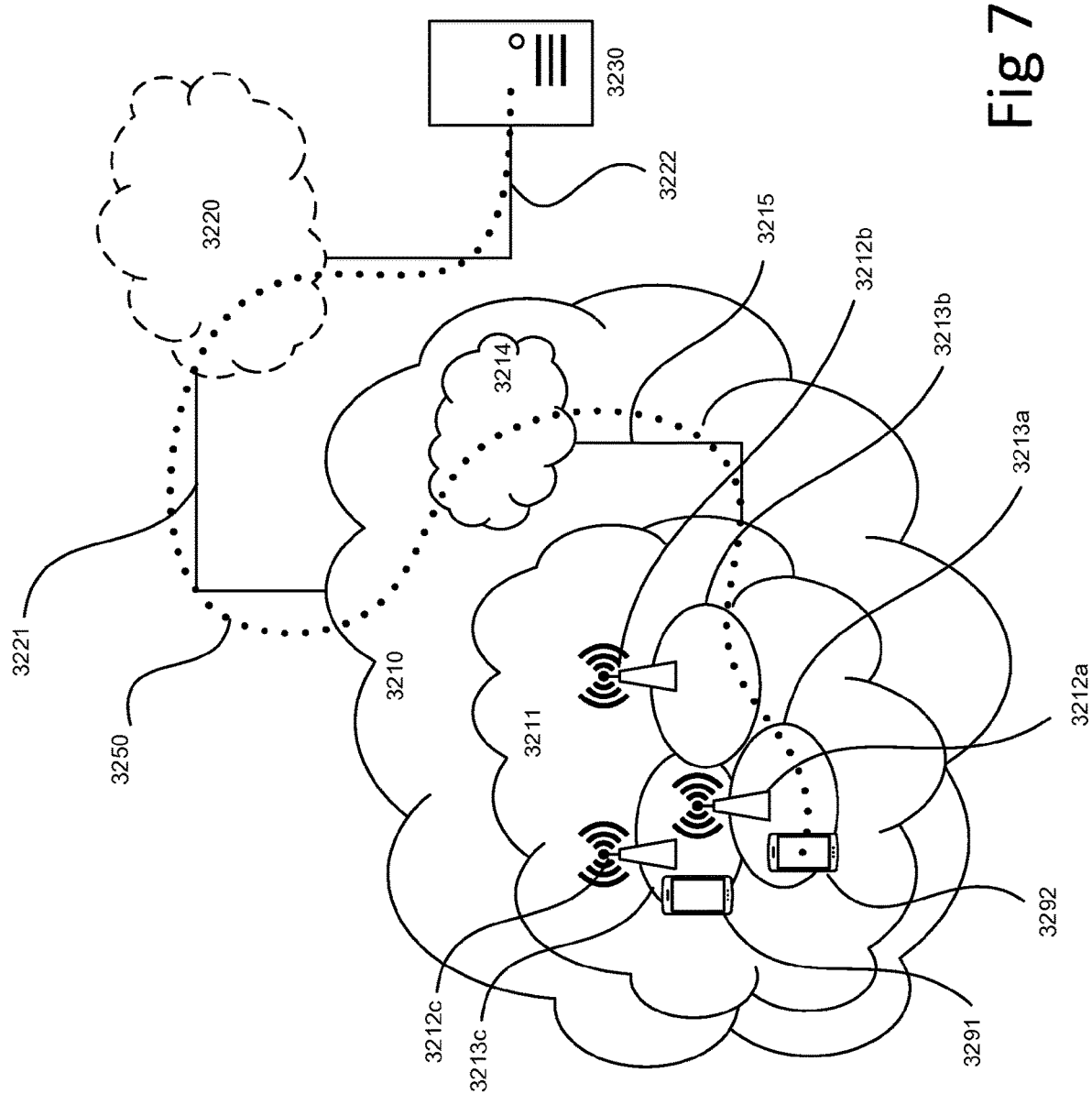
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

Figure 8:
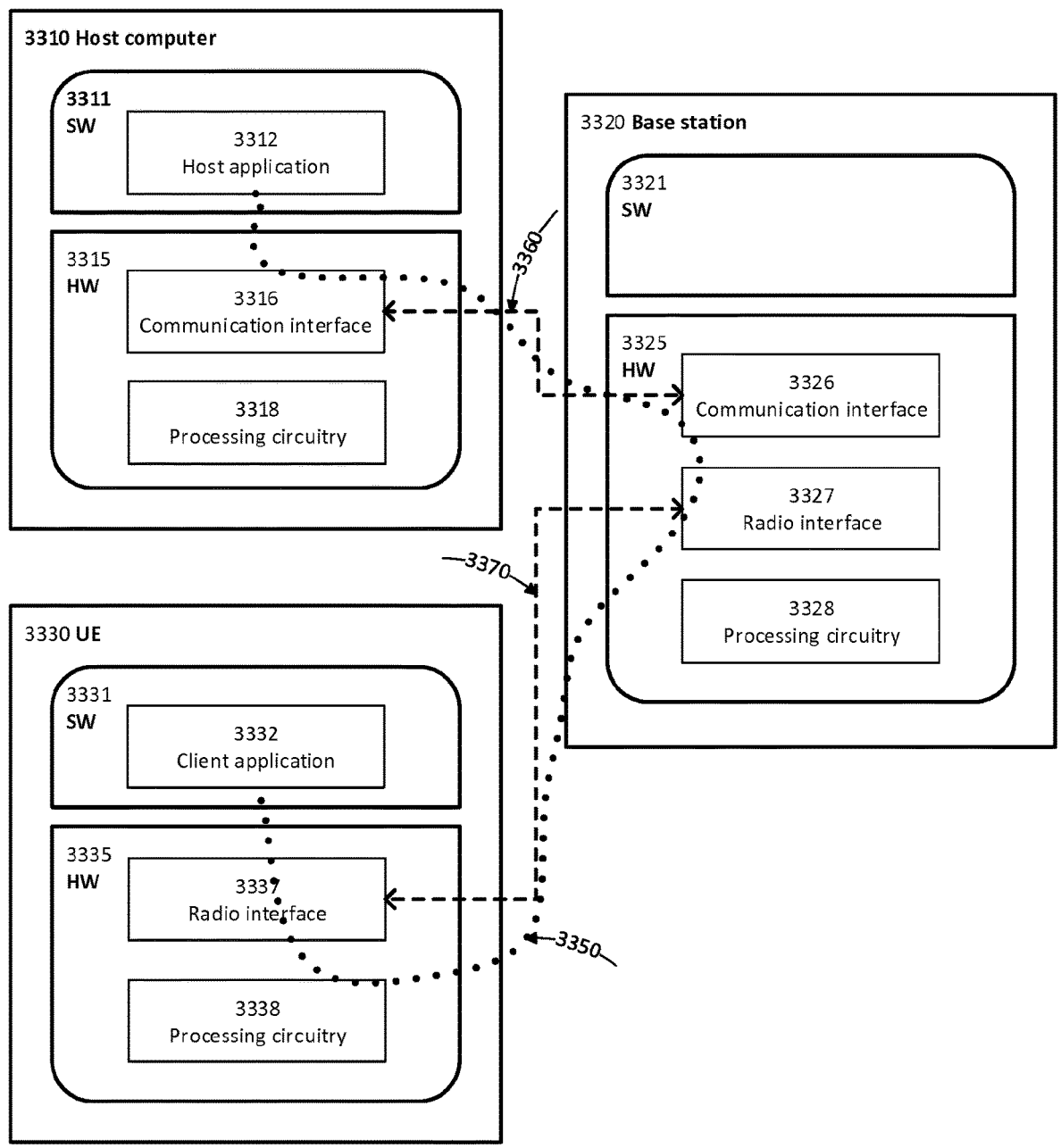
FIG. 8 is a generalized block diagram of a host computer communicating via a base station with a user equipment over a partially wireless connection.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. [If the radio-related invention has not yet been formulated at the time of drafting a provisional application, the expression "embodiments described throughout this disclosure" is meant to refer to the radio-related embodiments disclosed elsewhere in the application.] One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
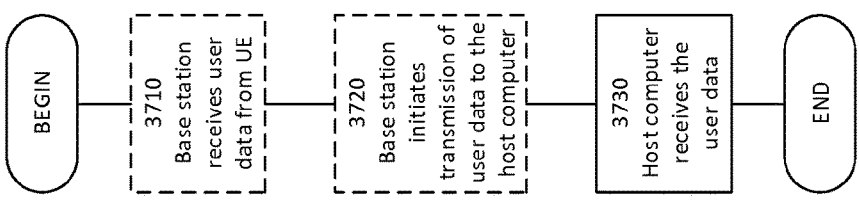
FIGS. 9 to 12 are flowcharts illustrating methods implemented in a communication system including a host computer, a base station and a user equipment.
Figure 11:
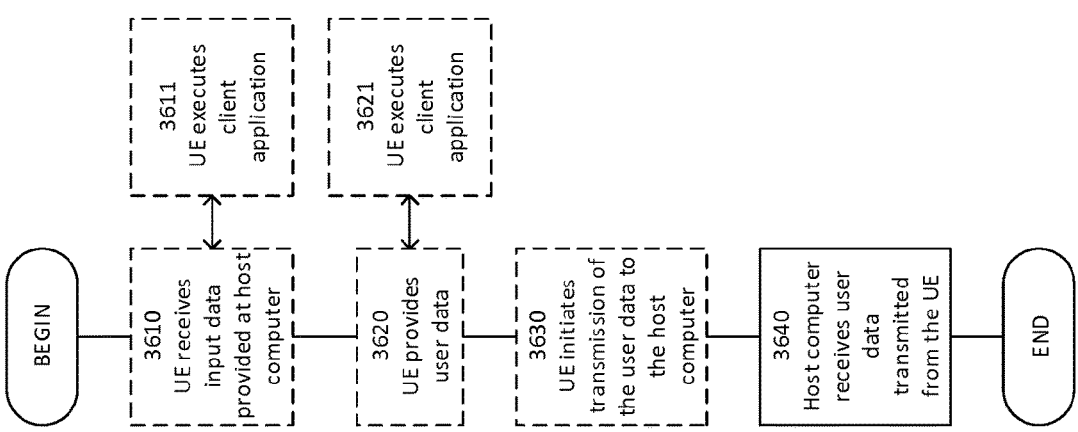
Figure 10:
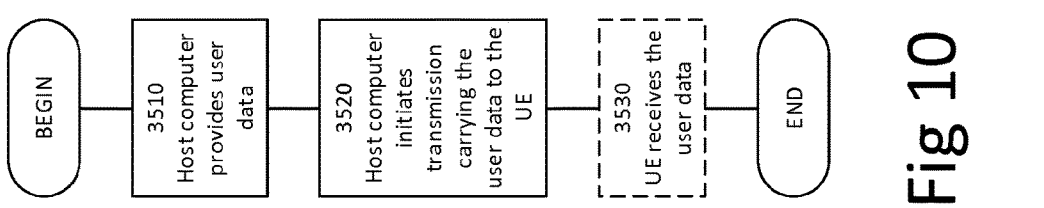
Figure 9:
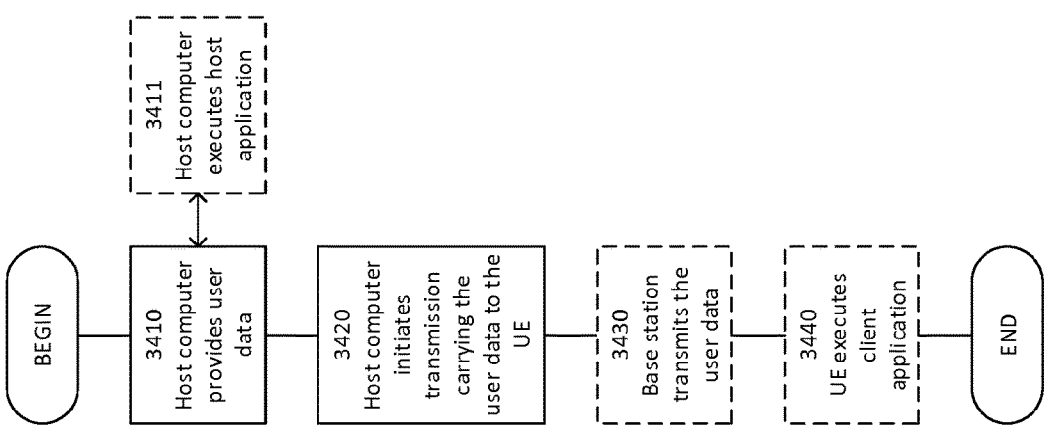

[FIGS. 9 and 10 and the corresponding text are about a downstream aspect of the radio-related invention, while FIGS. 11 and 12 and the corresponding text discuss an upstream aspect. If only one aspect is applicable for an invention, then, because the text and drawings are self-contained for each aspect, the text and drawings for the other aspect may be omitted without disadvantage.]

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Numbered Embodiments

[Embodiments 1, 11, 21 and 31 represent a downstream aspect of the radio-related invention, and embodiments 41, 51, 61 and 71 represent an upstream aspect of the radio-related invention. If the application must be finalized before the invention (or most important embodiments) have been formulated in claim language, then exceptionally the drafter may omit this section and rely on the expression "embodiments described throughout this disclosure" in the Detailed description.]

1. A base station configured to communicate with a user equipment (UE), the base station comprising a radio interface and processing circuitry configured to [functionalities in base station for preparing/initiating/maintaining/supporting/ending a transmission to the UE].

5. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to [functionalities in base station for preparing/initiating/maintaining/supporting/ending a transmission to the UE].

6. The communication system of embodiment 5, further including the base station.

7. The communication system of embodiment 6, further including the UE, wherein the UE is configured to communicate with the base station.

8. The communication system of embodiment 7, wherein:
  the processing circuitry of the host computer is configured to execute a host application, thereby providing the user data; and the UE comprises processing circuitry configured to execute a client application associated with the host application.

11. A method implemented in a base station, comprising [steps in base station for preparing/initiating/maintaining/supporting/ending a transmission to a UE].

15. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station [steps in base station for preparing/initiating/maintaining/supporting/ending a transmission to the UE].

16. The method of embodiment 15, further comprising:
at the base station, transmitting the user data.

17. The method of embodiment 16, wherein the user data is provided at the host computer by executing a host application, the method further comprising:
at the UE, executing a client application associated with the host application.

21. A user equipment (UE) configured to communicate with a base station, the UE comprising a radio interface and processing circuitry configured to [functionalities in UE for preparing/initiating/maintaining/supporting/ending receipt of the transmission from the base station].

25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to [functionalities in UE for preparing/initiating/maintaining/supporting/ending a transmission from a base station].

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising [steps in UE for preparing/initiating/maintaining/supporting/ending receipt of the transmission from a base station].

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE [steps in UE for preparing/initiating/maintaining/supporting/ending receipt of the transmission from the base station].

36. The method of embodiment 35, further comprising:
at the UE, receiving the user data from the base station.

41. A user equipment (UE) configured to communicate with a base station, the UE comprising a radio interface and processing circuitry configured to [functionalities in UE for preparing/initiating/maintaining/supporting/ending a transmission to the base station].

45. A communication system including a host computer comprising:
a communication interface configured to receive user data originating from a transmission from a user equipment (UE) to a base station,
wherein the UE comprises a radio interface and processing circuitry, the UE's processing circuitry configured to: [functionalities in UE for preparing/initiating/maintaining/supporting/ending the transmission to the base station].

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising [steps in UE for preparing/initiating/maintaining/supporting/ending a transmission to a base station].

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE [steps in UE for preparing/initiating/maintaining/supporting/ending a transmission to a base station].

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to [functionalities in base station for preparing/initiating/maintaining/supporting/ending receipt of the transmission from the UE].

65. A communication system including a host computer comprising a communication interface configured to receive user data originating from a transmission from a user equipment (UE) to a base station, wherein the base station comprises a radio interface and processing circuitry, the base station's processing circuitry configured to [functionalities in base station for preparing/initiating/maintaining/supporting/ending the transmission from the UE].

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising [steps in base station for preparing/initiating/maintaining/supporting/ending receipt of the transmission from a UE].

75. A method implemented in a communication system including a host computer, a base station and a user equipment (UE), the method comprising:
at the host computer, receiving, from the base station, user data originating from a transmission which the base station has received from the UE, wherein the UE [steps in base station for preparing/initiating/maintaining/supporting/ending receipt of a transmission from the UE].

76. The method of embodiment 75, further comprising:
at the base station, receiving the user data from the UE.

77. The method of embodiment 76, further comprising:
at the base station, initiating a transmission of the received user data to the host computer.

The invention claimed is:

1. A method, implemented by a communication arrangement supporting link aggregation of a plurality of communication links, the method comprising:
obtaining data segments to be transmitted;
identifying data flows comprising the obtained data segments;
attaching sequence numbers to the data segments, wherein the sequence numbers are independent between the data flows;
determining a subset of available communication links out of the plurality of communication links, each of the available communication links having capacity available for transmission of the data segment within a current time period; and
selecting, for each of the data segments, a communication link for transmission of the data segment, the selecting being between a new communication link and a previous communication link based respectively on whether or not the previous communication link is congested;
wherein the previous communication link has been used for transmission of a previous data segment comprised in the data flow of the data segment most recently to the data segment; and
wherein the new communication link is comprised in the subset of available communication links having capacity available for transmission.

2. The method of claim 1, wherein the identifying comprises determining a hash checksum based on a predetermined section of each data segment, wherein a data flow is identified by a respective hash checksum.

3. The method of claim 1, wherein the attaching comprises compressing sequence numbers prior to the attaching.

4. The method of claim 3, wherein the compressing comprises differentially compressing attached sequence numbers according to an arithmetic difference between a previous and a current sequence number.

5. The method of claim 3, wherein the compressing comprises generating an implicit sequence number configured to be unambiguously recreated on a receiving side of the communication link out of the plurality of communication links.

6. The method of claim 1, wherein the determining comprises maintaining a Link Characterization Table comprising status information associated with each communication link in the plurality of communication links.

7. The method of claim 6, wherein the status information comprises flow control information indicating if the communication link is available for transmission of the data segment.

8. The method of claim 1:
wherein the selecting comprises maintaining a transmit Flow Identity Table (tFIT) comprising:
Flow Identities (FI) associated with the identified data flows; and
corresponding communication link identifiers (LID);
wherein the LIDs are used for identifying the previous communication link used for transmission of the most recently transmitted data segment associated with each FI out of the plurality of communication links.

9. The method of claim 8, wherein the tFIT comprises the attached sequence number of the most recently transmitted data segment associated with each FI.

10. The method of claim 1:
wherein the plurality of communication links comprises one or more radio communication links; and
wherein a communication arrangement comprises a traffic handling unit and a communication link interface for each communication link.

11. A communication arrangement adapted for link aggregation of a plurality of communication links, which communication arrangement is configured to communicate via the plurality of communication links, the communication arrangement comprising:
processing circuitry and memory containing instructions executable by the processing circuitry causing the communication arrangement to:
obtain data segments to be transmitted;
identify data flows comprising the obtained data segments;
attach sequence numbers to the data segments wherein the sequence numbers are independent between the data flows;
determine a subset of available communication links out of the plurality of communication links, each of the available communication links having capacity available for transmission of a data segment within a current time period; and
select, for each of the data segments, a communication link for transmission of the data segment, the selecting being between a new communication link and a previous communication link based respectively on whether or not the previous communication link is congested;

wherein the previous communication link has been used for transmission of a previous data segment comprised in the data flow of the data segment most recently to the data segment; and wherein the new communication link is comprised in the subset of available communication links having capacity available for transmission.

* * * * *